(12) United States Patent
Takenaga et al.

(10) Patent No.: US 7,247,838 B2
(45) Date of Patent: *Jul. 24, 2007

(54) RAIN/MOISTURE AND OBJECT IMAGING SYSTEM FOR VEHICLE

(75) Inventors: Hiroshi Takenaga, Toukai (JP); Yuji Otsuka, Hitachi (JP); Shoji Muramatsu, Hitachi (JP); Tatsuhiko Monji, Hitachinaka (JP); Ken Ohsumi, Hitachinaka (JP); Isao Furusawa, Hitachinaka (JP); Masaaki Fukuhara, Mito (JP); Hiroyuki Kasuya, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/474,337

(22) Filed: Jun. 26, 2006

(65) Prior Publication Data

US 2006/0243894 A1    Nov. 2, 2006

Related U.S. Application Data

(63) Continuation of application No. 10/916,444, filed on Aug. 12, 2004, now Pat. No. 7,208,723.

(30) Foreign Application Priority Data

Aug. 12, 2003 (JP) ............................. 2003-207237
Dec. 12, 2003 (JP) ............................. 2003-414076
Mar. 31, 2004 (JP) ............................. 2004-106853

(51) Int. Cl.
*G02B 6/26* (2006.01)
*G01F 23/00* (2006.01)

(52) U.S. Cl. ................. 250/227.25; 250/574; 340/602; 340/438; 73/29.01; 73/29.04; 73/29.05

(58) Field of Classification Search ........... 250/227.25, 250/574, 208.1; 73/29.01, 29.02, 29.04, 73/29.05, 335.01; 340/601, 602, 438; 318/643
See application file for complete search history.

(56) References Cited

U.S. PATENT DOCUMENTS 4,314,186 A    2/1982 Gille (Continued)

FOREIGN PATENT DOCUMENTS

DE    199 09 986    9/2000

(Continued)

OTHER PUBLICATIONS

Sensors And Microsystems, Proceedings of the 8th Italian Conference, Trento, Italy, Feb. 12-14, 2003, Pallaro et al, pp. 534-539 XP008060324.

*Primary Examiner*—Georgia Epps
*Assistant Examiner*—Davienne Monbleau
(74) *Attorney, Agent, or Firm*—Antonelli, Terry, Stout & Kraus, LLP.

(57) ABSTRACT

An image processing system includes a lamp which emits light to a glass, an imaging device which captures light which is emitted from the lamp and reflected by the glass, and an optical filter, located between the glass and the imaging device, which transmits rays with a specific wavelength of the reflected light. A lens is provided in front of the imaging device, and a focus of the lens is adjusted to a point beyond the glass, and an image processor is provided which processes an image captured by the imaging device and detects moisture on the glass.

17 Claims, 20 Drawing Sheets

U.S. PATENT DOCUMENTS

| | | |
|---|---|---|
| 4,867,561 A | 9/1989 | Fujii |
| RE35,762 E | 4/1998 | Zimmerman |
| 6,207,967 B1 | 3/2001 | Hochstein |
| 6,281,649 B1 | 8/2001 | Ouellette |
| 6,323,477 B1 | 11/2001 | Blasing |
| 6,353,392 B1 | 3/2002 | Schofield |
| 6,392,218 B1 | 5/2002 | Kuehnle |
| 6,429,933 B1 | 8/2002 | Jackson |
| 6,573,490 B2 | 6/2003 | Hochstein |
| 6,614,043 B2 | 9/2003 | Hochstein |
| 6,669,109 B2 | 12/2003 | Inanov |
| 6,681,163 B2 | 1/2004 | Stam |
| 6,806,485 B2 | 10/2004 | Jackson, Jr. |
| 6,861,636 B2 | 3/2005 | Ockerse |
| 6,946,639 B2 | 9/2005 | Stam |
| 2003/0001121 A1 | 1/2003 | Hochstein |
| 2003/0069674 A1 | 4/2003 | Stam |
| 2005/0206511 A1* | 9/2005 | Heenan et al. ............ 340/438 |

FOREIGN PATENT DOCUMENTS

| | | |
|---|---|---|
| EP | 1 418 089 | 5/2004 |
| GB | 2 056 059 | 3/1981 |
| GB | 1 596 050 | 8/1981 |
| JP | 7-89099 | 9/1995 |
| JP | 11-160779 | 6/1999 |
| JP | 2001-516670 | 10/2001 |

* cited by examiner

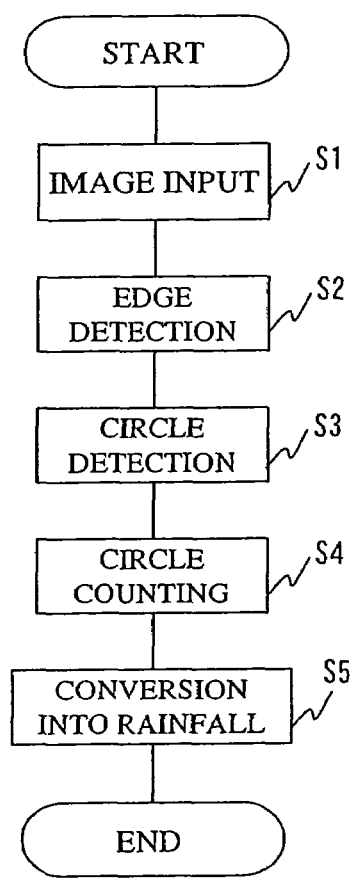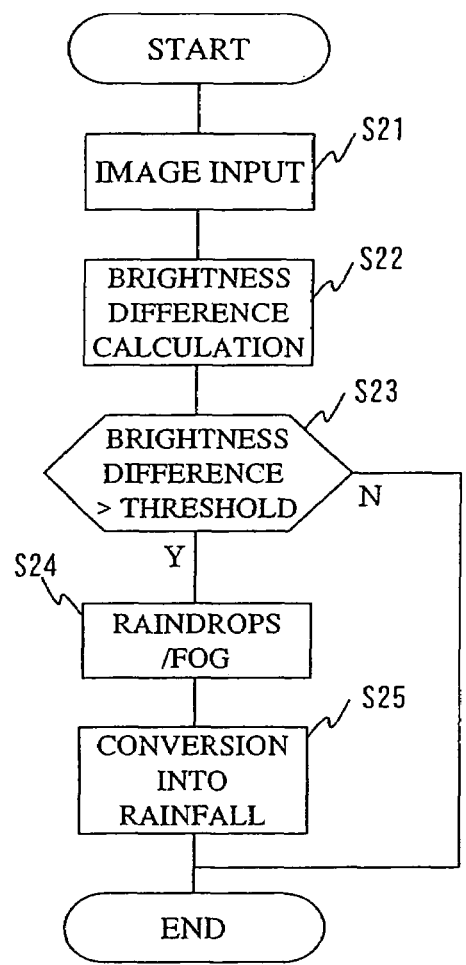
FIG. 16 A
FIG. 16 B

|  |  | Fog Lamp | High Beam |
|---|---|---|---|
| Amount of rainfall | Large | OFF: Automatically turns ON or warning to urge the driver to turn ON<br>ON: Nothing is done. | OFF: Disabled<br>ON: Automatically turns OFF or warning to urge the driver to turn OFF |
|  | Small | No control | Automatically turns ON or OFF according to the position (distance, direction) of a vehicle in front or an oncoming vehicle | ized herein by reference.

RAIN/MOISTURE AND OBJECT IMAGING SYSTEM FOR VEHICLE

CROSS REFERENCE TO RELATED APPLICATION

This application is a continuation application of U.S. application Ser. No. 10/916,444, filed Aug. 12, 2004 now U.S. Pat. No. 7,208,723, the contents of which are incorporated herein by reference.

BACKGROUND OF THE INVENTION

1. Field of the Invention

The present invention relates to an image processing system which is suitable for detection of foreign matter on surfaces of various types of window.

2. Description of Related Art

Droplets such as raindrops, fog and dust on surfaces of window glass used in vehicles, ships and aircraft or in ordinary buildings deteriorate the visibility of the window. A known solution to this problem is an image processing system which detects such foreign matter and removes it by various means.

Patent Literature 1 (JP-B No. 89099/1995) discloses a technique that window is illuminated by two light sources and reflected light from the window is detected by an imaging device and raindrops on the outer surface of the window and fog on its inner surface are evaluated according to the intensity of the reflected light. Patent Literature 2 (PC (WO) 2001-516670) discloses a technique of simplifying an image processing system that one light source and a lens are used to illuminate window and reflected light from the window is detected by an imaging device to evaluate foreign mater on the outer surface of the window. Patent Literature 3 (JP-A No. 160779/1999) describes a technique that a filter in front of an in-vehicle camera is moved in and out mechanically by a motor to capture images under a plurality of conditions to detect foreign matter on an outer surface of window.

SUMMARY OF THE INVENTION

Among the above conventional techniques, the technique which uses two light sources to detect reflected light requires reflected light to be thrown on an independent area of an imaging device and thus requires a special optical system for that purpose. This poses various problems. One problem is that it is difficult to simplify the image processing system. Another problem is that the influence of external light such as sunlight cannot be prevented. Furthermore, for the technique that uses one light source for detection of reflected light, it is difficult to decide whether reflected light comes from outside the window or inside it and it is also hard to detect a white line ahead of the user's own vehicle or a vehicle in front at the same time because the lens is focused on the window.

With the above conventional techniques, it is impossible to capture images at a time under a plurality of conditions or to capture images successively under a plurality of conditions. Besides, it is expected that in the future the speed of an imaging device and an image processor will be increased in order to acquire a large volume of information in a short time and process it quickly. However, because the conventional techniques involve mechanical movement, it is difficult to deal with high image processing speeds. The quality of in-vehicle products is required to be high enough to withstand harsh ambient conditions including wide variation in temperature and humidity. In this sense, products with mechanically movable parts are not desirable from the viewpoint of reliability.

The present invention has been made in view of the above circumstances and provides an image processing system which takes images under a plurality of conditions using a camera without mechanically movable parts to detect foreign matter on window accurately.

In order to achieve the above object, according to the present invention, an image processing system includes: a light source which emits light to window; an imaging device which captures light which is emitted from the light source and reflected by foreign matter on the window; and an image processor which processes an image captured by the imaging device, where an optical filter which transmits lights with a specific wavelength of the reflected light is located between the window and the imaging device. The optical filter should transmit light with wavelengths in a wavelength range in which the window transmittance is above a prescribed level and the photosensitivity of the imaging device is high enough, or should block light with wavelengths in the visible light range and transmit light with longer wavelengths than visible light, to which the imaging device is sensitive. The optical filter may consist of one filter having areas with different optical characteristics. Alternatively, a lens or lens cover which is located in front of the imaging device may have optical characteristics similar to those of the above optical filter.

BRIEF DESCRIPTION OF THE DRAWINGS

The invention will be more particularly described with reference to the accompanying drawings, in which:

FIG. 1A is a sectional side view of an image processing system and FIG. 1B is a front view of it as seen through windshield from outside a vehicle;

FIG. 5A shows transmittances of windshield and an imaging device and FIG. 5B shows filter transmittances;

FIG. 6A shows a bandpass filter covering an imaging device, FIG. 6B shows a bandpass filter partially covering it, FIG. 6C shows a bandpass filter combined with an infrared cut filter and FIG. 6C shows a filter having a bandpass filter area and an infrared cut area;

FIG. 7A shows an imaging device structure, FIG. 7B shows an image captured by an imaging device, and FIG. 7C shows an image of taillight and headlight;

FIG. 9A shows a relative position of a filter, FIG. 9B shows infrared cut filter characteristics and FIG. 9C shows bandpass filter characteristics and FIG. 9C shows an image of raindrops captured by an imaging device;

FIG. 10A shows a filter with an infrared bandpass area at the top, FIG. 10B shows a filter with an infrared bandpass area on the left, FIG. 10C shows a filter with an infrared bandpass area at the bottom and FIG. 10D shows a filter with an infrared bandpass area on the right;

FIG. 13A shows an inclined image processor, FIG. 13B shows the relation between an image and an infrared cut area and FIG. 13C shows a captured image;

FIG. 15A is a lamp drive circuit diagram and FIG. 15B is a light emission timing diagram;

FIGS. 16A and 16B are flowcharts showing raindrop detection sequences where FIG. 16A shows a process based on the number of raindrops and FIG. 16B shows a process based on brightness difference;

FIG. 25A shows an array of lamps, FIG. 25B shows fog on windshield, FIG. 25C shows a drive circuit for an array of lamps and FIG. 25D shows a lamp drive circuit with transistors;

DETAILED DESCRIPTION OF THE PREFERRED EMBODIMENTS

Next, preferred embodiments of the present invention will be described referring to the accompanying drawings.

Figure 1:
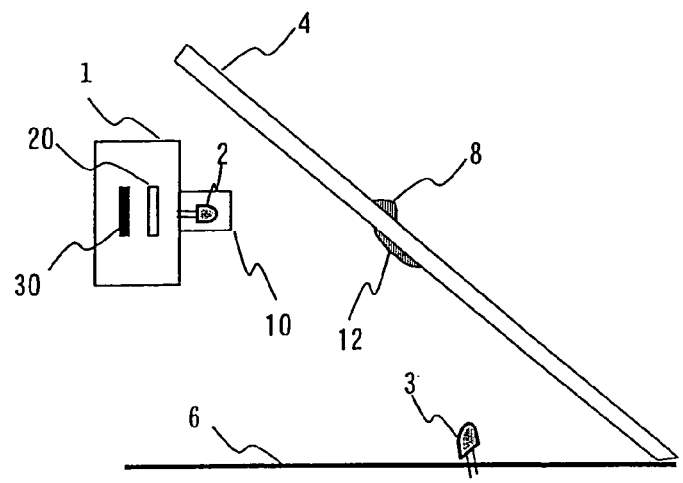
FIGS. 1A and 1B are schematic diagrams showing an image processing system according to an embodiment of the present invention where
Figure 1:
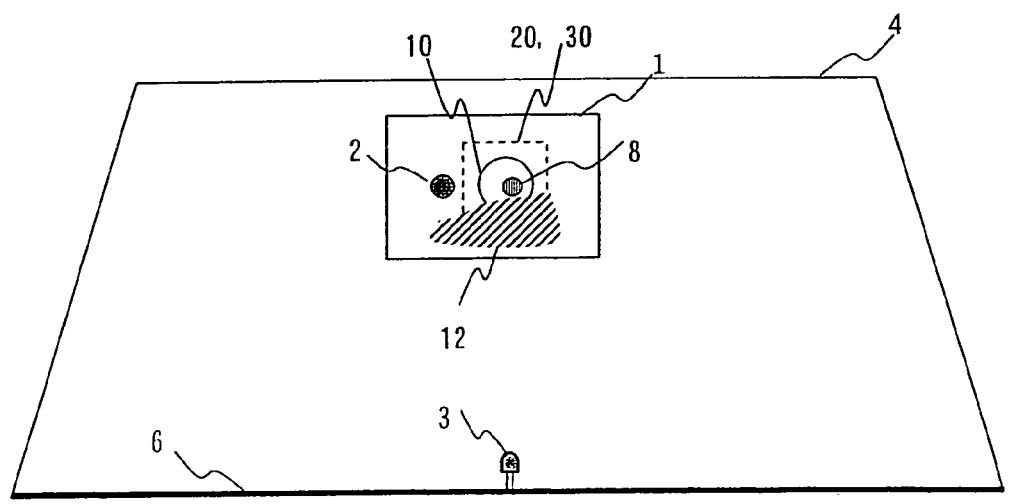

FIG. 1A is a sectional side view of an image processing system according to an embodiment of the present invention and FIG. 1B is a front view of it as seen through windshield from outside a vehicle.

This image processing system consists of an image processor 1, a first lamp 2 and a second lamp 3. The time to turn on the first lamp 2 and second lamp 3 is controlled by the image processor 1. The image processor is installed inside the vehicle facing windshield 4. The first lamp 2, located alongside the image processor 1, emits light toward the windshield 4. The second lamp 3 emits light toward the windshield 4 upwards or from below.

Figure 2:
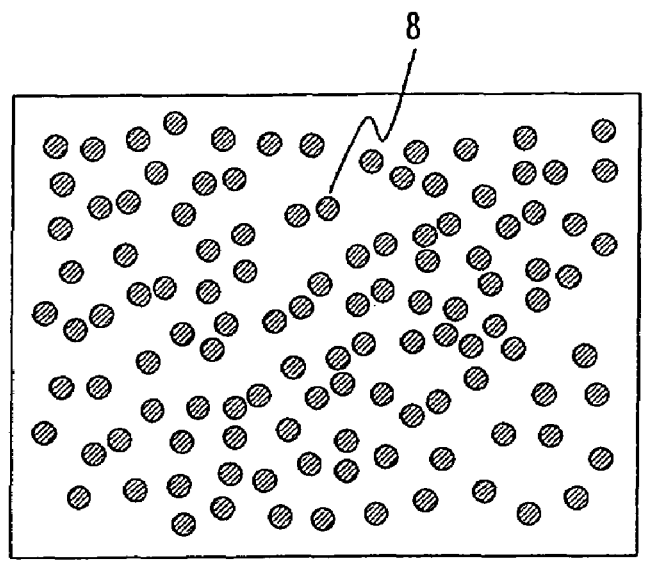
FIG. 2A shows an image of raindrops taken by an imaging device and FIG. 2B shows an image of fog taken by it.
Figure 2:
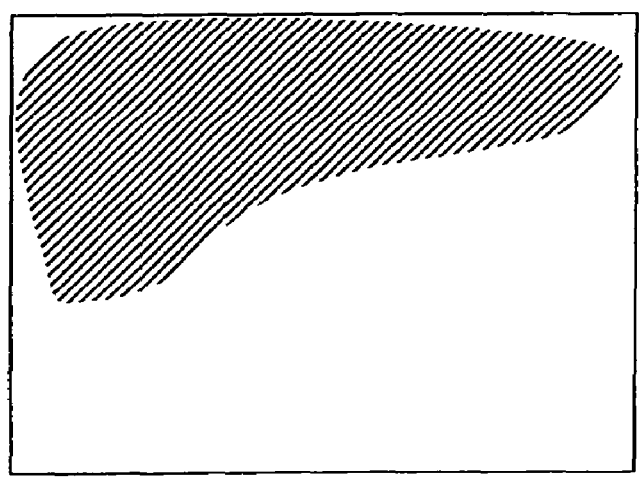

A drive circuit in the image processor 1 turns on the first lamp 2 to emit light toward the windshield 4. The light emitted from the first lamp 2 passes through the windshield 4 when the glass is clean. The light reflected by the windshield 4 goes down and does not enter the image processor 1. However, if there is a raindrop 8 on the outer surface of the windshield 4, the light emitted from the first lamp 2 is reflected by the raindrop 8. A lens 10 of the image processor 1 is provided alongside the first lamp 2. Therefore, the light reflected by the raindrop 8 passes through the lens 10 of the image processor 1 and enters an imaging device 30 through an optical filter 20 with prescribed optical characteristics. If there is no raindrop 8 on the outer surface of the windshield 4, the light emitted from the first lamp 2 passes through the window glass 4 and goes forward straight and never enters the imaging device 30. FIG. 2A shows an example of an image which is captured by the imaging device 30 when many raindrops are on the windshield 4. The raindrops look almost circular. When the windshield 4 is water-repellent, the raindrops more look like circles.

The second lamp 3 is located below the image processor 1 on a dashboard 6 inside the vehicle. The drive circuit in the image processor 1 turns on the second lamp 3 to emit light toward the windshield 4. The light emitted from the second lamp 3 is totally reflected by the inner surface of the windshield 4 and the reflected light passes through the lens 10 of the image processor 1 and enters the imaging device 30. However, if there is some fog 12 on the inner surface of the windshield 4, the light from the second lamp 3 is scattered by the fog 12 and some rays of the light pass through the lens 10 of the image processor 1 and enter the imaging device 30 through the optical filter 20. FIG. 2B shows an image which is captured by the imaging device 30 when the upper part of the windshield 4 is foggy. The fog makes it difficult for the driver to see ahead.

Figure 3:
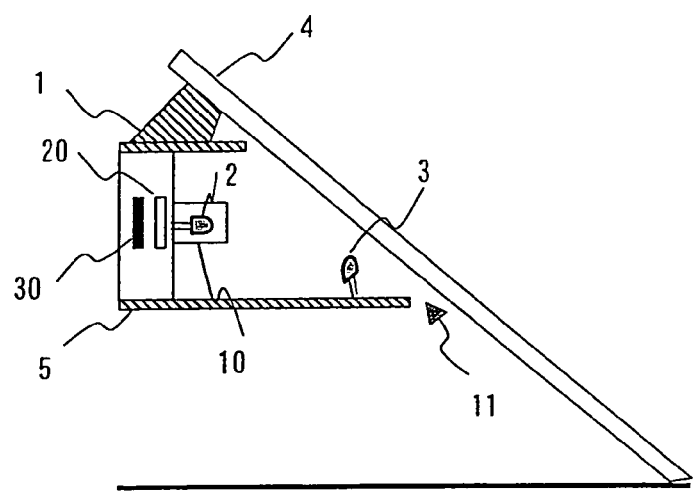
FIG. 3 is a schematic diagram showing an image processing system according to another embodiment of the present invention.

In the embodiment shown in FIGS. 1A and 1B, a control signal line from the image processor 1 to the second lamp 3 on the dashboard 6, which suggests a long control signal line, is needed. FIG. 3 shows another embodiment of the present invention. As shown in FIG. 3, for the sake of compactness of the image processing system, the image processor 1 and first lamp 2 and second lamp 3 are housed in a case 5.

Figure 4:
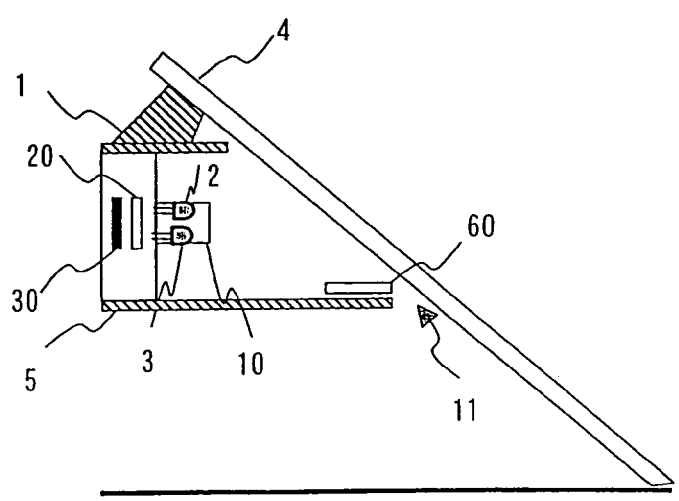
FIG. 4 is a schematic diagram showing an image processing system according to another embodiment of the present invention.

A further embodiment of the invention is illustrated in FIG. 4. Here, the second lamp 3 is also located alongside the image processor 1 and a mirror 60 is placed in a position of the case 5 where light from the second lamp 3 is reflected by the windshield 4. Consequently, light emitted from the second lamp 3 is reflected by the windshield 4 and thrown on the mirror 60; then the light is reflected by the mirror 60 and again reflected by the windshield 4 before going to the imaging device 30 of the image processor 1. In this case, the mirror 60 may be located on the dashboard instead of in the case 5. The positions of the first lamp 2, second lamp 3 and mirror 60 should be determined so that light from the first lamp 1 which is reflected by the mirror 60 is not thrown on the lens 10 of the image processor 1, though light from the second lamp 3 is reflected by the mirror 60 and thrown on the lens 10.

In the image processing system shown in FIG. 3, the second lamp 3 must be located near the windshield 4 to ensure that light emitted from the second lamp 3 is totally reflected by the inner surface of the windshield 4 and thrown on the imaging device 30. In this embodiment, the case 5 has a vent 11. The vent 11 is provided for the following reason. If the image processor 1, first lamp 2 and second lamp 3 should be enclosed by the case 5 with no vent, fog in another area of the windshield 4 might not spread to the windshield area adjacent to the image processing system. On the other hand, in this case, due to the vent 11, fog which originates somewhere else on the windshield 4 will spread to the windshield area adjacent to the image processing system.

While the embodiments shown in FIG. 1A, FIG. 1B and FIG. 3 and FIG. 4 each include the image processor 1, first lamp 2 and second lamp 3, it is possible that an image processing system uses the image processor 1 and either the first lamp 2 or the second lamp 3.

In embodiments of the present invention, the first lamp 2 or second lamp 3 may emit visible light or infrared light. If the wavelength range of a lamp which is installed in a vehicle is restricted, a specific wavelength should be selected from among wavelengths which well pass through the windshield 4. For example, as shown in FIG. 5A, a wavelength should be selected from within the wavelength range in which the transmittance 32 of the windshield 4 is above a prescribed level (70% in the case of FIG. 5A) and the photosensitivity 31 of the imaging device 30 is high enough (in this example, the wavelength should be shorter than fa; concretely a wavelength in the visible light range of 400-600 nm). Alternatively, in order not to dazzle oncoming vehicles or pedestrians, wavelength fb should be selected from within the range of wavelengths which are longer than wavelengths of visible light and can be dealt with by the photosensitivity 31 of the imaging device 30 (for example, fb is a wavelength in the infrared wavelength range of 800-1000 nm). The optical filter should have characteristics which match the wavelengths of the first lamp 2 and second lamp 3 which are thus selected. In the latter case, or when the wavelength of the lamp is in the infrared wavelength range, the optical filter used should be such that it blocks light with wavelengths in the visible light range and transmits light with wavelengths longer than visible light, to which the imaging device is sensitive.

Figure 5:
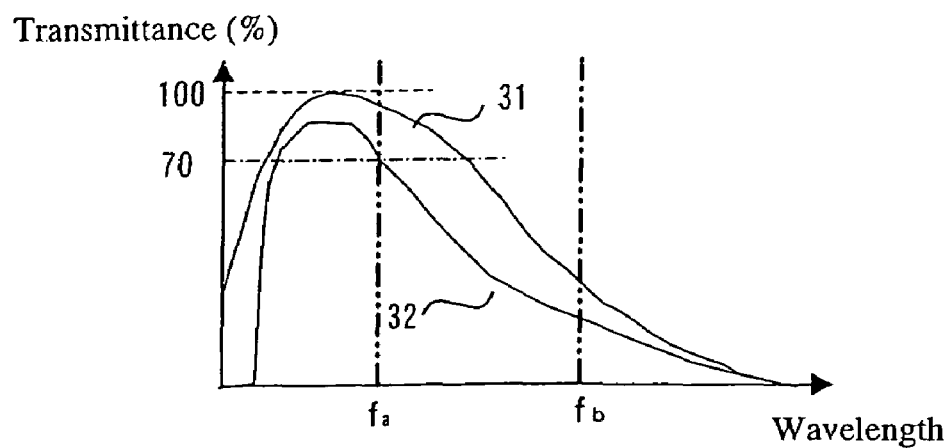
FIGS. 5A and 5B are optical characteristic graphs concerning an optical filter where
Figure 5:
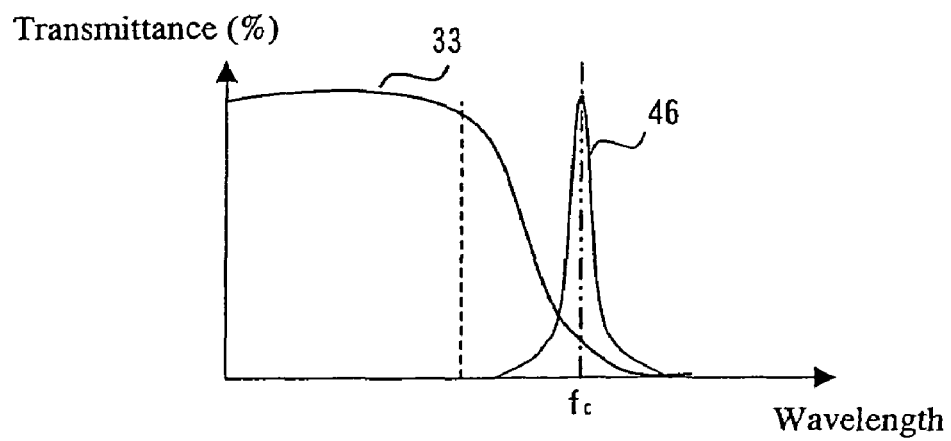
Figure 6:
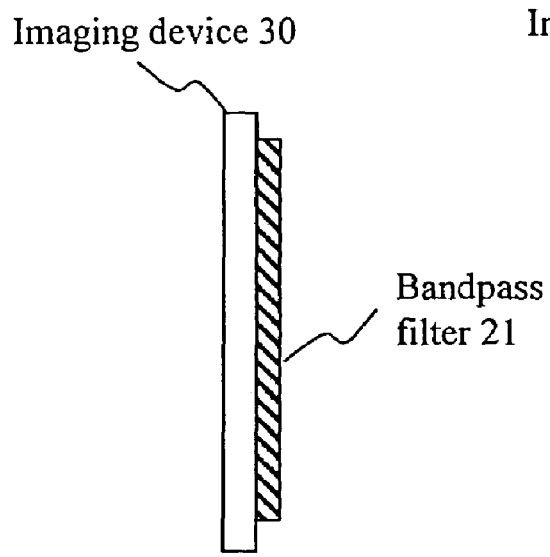
FIGS. 6A, 6B, 6C and 6D are schematic diagrams of optical filters where
Figure 6:
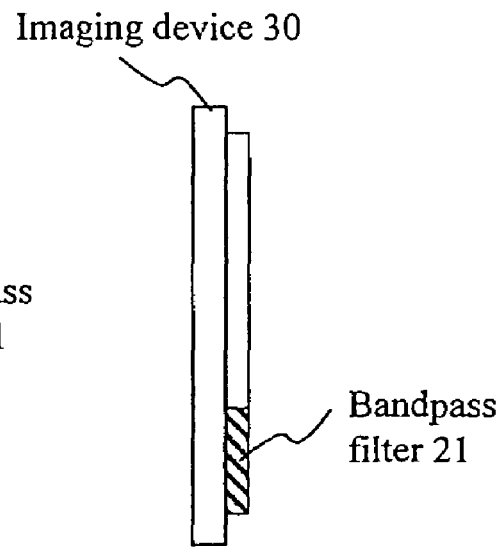
Figure 6:
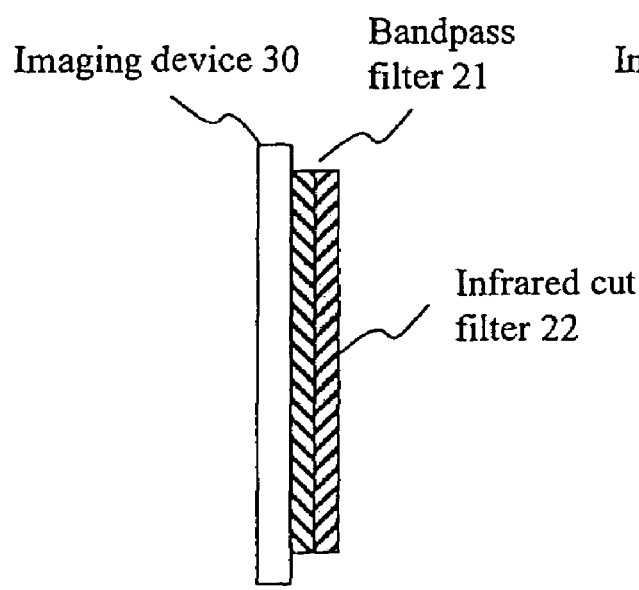
Figure 6:
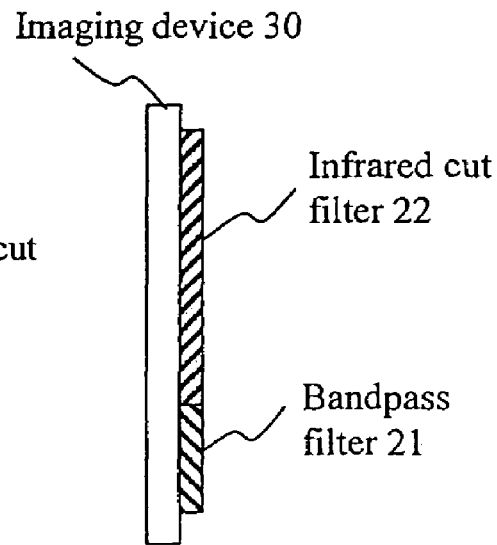

FIGS. 6A to 6D show various examples of the optical filter 20. FIG. 6A shows that the incoming light side of the imaging device 30 is covered by a bandpass filter 21 which transmits light with a specific wavelength. This filter is designed to detect only raindrops or fog. Since it receives only light with a specific wavelength emitted from the lamp 2 or lamp 3, there is no influence of external light. FIG. 6B shows that the incoming light side of the imaging device 30 is partially covered by the bandpass filter 21. While in the example of FIG. 6A the imaging device 30 only receives light with a specific wavelength, in the example of FIG. 6B it receives not only such light but also light with other wavelengths and thus can capture an image of a scene outside the vehicle through the windshield 4 and process it. When the infrared transmittance of the windshield 4 is high, the influence of sunlight as external light is reduced as follows. As shown in FIG. 6C, an infrared cut filter 22 is attached to the incoming light side of the bandpass filter 21 of FIG. 6B. Also, as shown in FIG. 6D, one optical filter may consist of an infrared cut filter area and a bandpass filter area. FIG. 5B shows transmittances of the infrared cut filter and bandpass filter (wavelength fc). For example, the bandpass filter may have a central transmission wavelength fc of 850 nm and transmit light with a half bandwidth of ±20 nm in which the transmittance is reduced to half.

Figure 7:
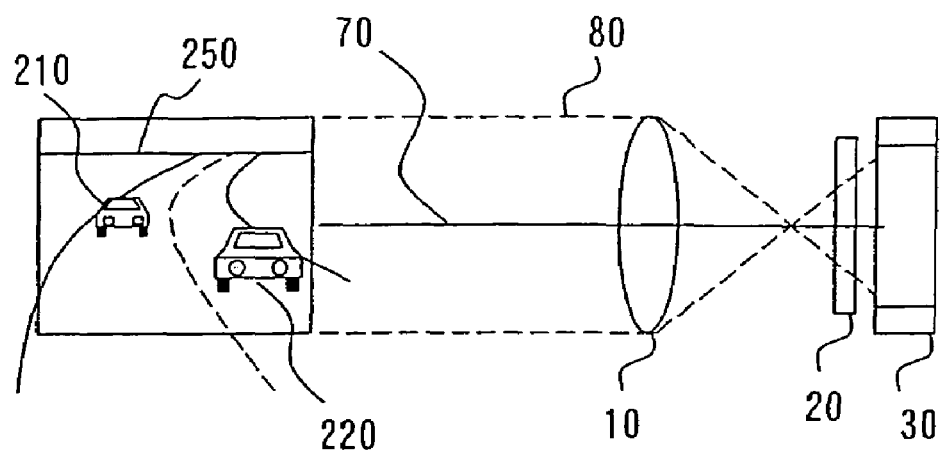
FIGS. 7A, 7B and 7C illustrate an example of an adaptive front lighting control function where
Figure 7:
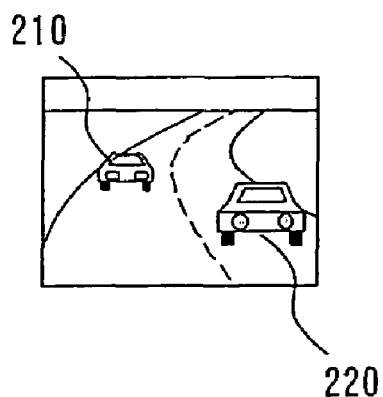
Figure 7:
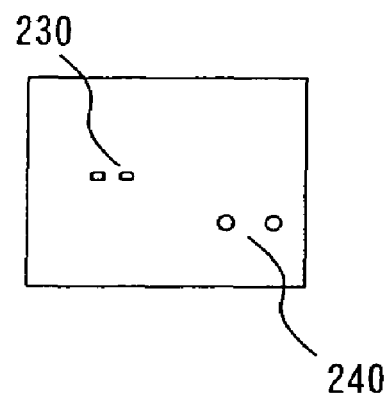

When some area of the imaging device 30 receives light passing through the infrared cut filter area and its other area receives light passing through the bandpass filter area (see FIG. 6D), not only raindrops or fog on the windshield 4 but also another type of object such as a vehicle or a traffic lane can be detected. FIGS. 7A to 7C show one such embodiment. In this embodiment, one imaging device has both a headlight distribution control function and a raindrop detection function.

As shown in FIG. 7A, an in-vehicle image processor is installed in the front part of the vehicle to take an image of a scene ahead through the windshield 4, namely capture an image as shown in FIG. 7B through the imaging device 30. The adaptive front lighting system works as follows. The image processing system 1 processes the image (FIG. 7B) and extracts taillight 230 of a vehicle in front 210 and headlight 240 of an oncoming vehicle 220 as shown in FIG. 7C. Then, the position of the vehicle in front and that of the oncoming vehicle are measured from the image of FIG. 7C and the headlights of the user's own vehicle are controlled according to their positions. Reference numeral 250 represents a skyline.

As seen from FIG. 7B, the adaptive front lighting function can be realized when it is possible to process an image which covers an area ranging from the headlights or taillights of a far vehicle to the headlights or taillights of a nearby vehicle. The presence of a vehicle in front should be recognized by its taillights. However, usually the light intensity of taillights of a vehicle in front is lower than that of headlights of an oncoming vehicle and because of much disturbing light such as street light, it is difficult to detect taillights only by its brightness. Hence the red color of the taillights must be recognized to identify them.

Figure 8:
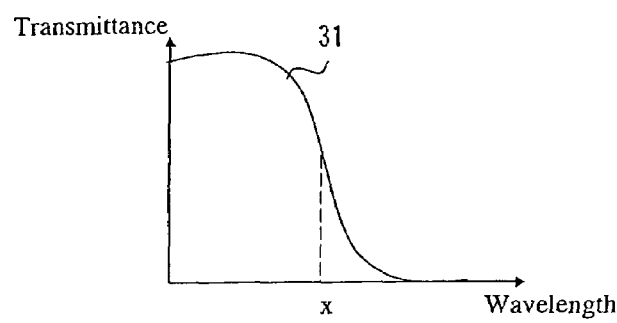
FIG. 8 shows a filter's infrared blocking characteristics.

However, if, for this reason, a color imaging device is used as the imaging device 30 to recognize the red color, it is difficult to extract the red part corresponding to taillight from an image captured only by the device because the overall image is reddish. Therefore, a filter which blocks infrared light as indicated in FIG. 8 may be located at the position of the optical filter 20 or in front of the lens 10 (FIG. 7A) to facilitate distinction between red and other colors. This eliminates other colors as a disturbing factor and improves the taillight detection accuracy. For an infrared cut filter which has characteristics as shown in FIG. 8, the wavelength x at which it begins to block light begins and the way the transmittance declines should be selected according to the application purpose, imaging device performance and the transmittance of the windshield 4 (FIG. 5). Typically, the wavelength x (FIG. 8) is approx. 600 nm.

The explanation given below assumes that the wavelength of the lamp 2 is, an infrared wavelength, for example, 850 nm. The lamp 2, which emits infrared light, may be an LED, semiconductor laser or similar device. Here, the lamp 2 may be angled in a way that light reflected by a raindrop 8 on the windshield 4 reaches the imaging device 30. Infrared light rays 43 which it emits toward the windshield 4 may be radial or parallel.

The problem here is that if the infrared light reflected by the raindrop is to be detected directly, the lamp 2 must emit infrared light which is brighter than intense disturbing light such as sunlight.

Figure 9:
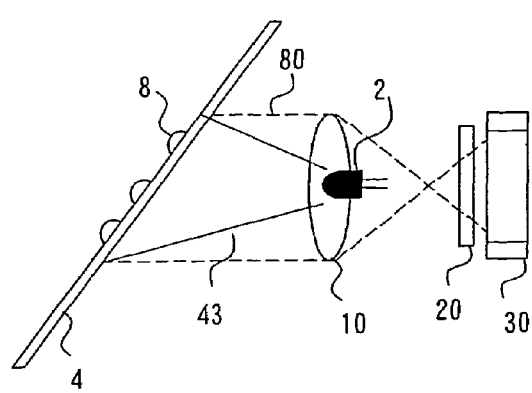
FIGS. 9A, 9B, 9C and 9D show a raindrop detection function where
Figure 9:
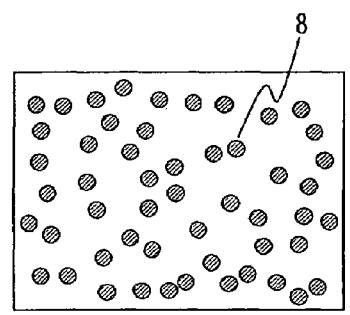
Figure 9:
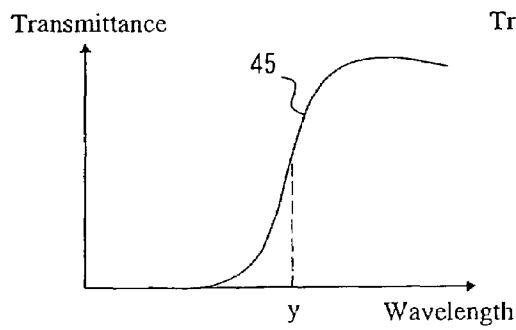
Figure 9:
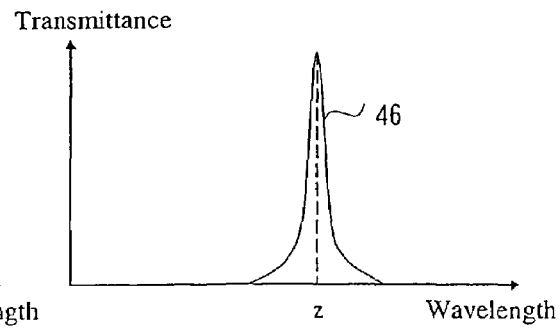

A solution to this problem is that a filter with characteristics as shown in FIG. 9B, namely a filter which blocks light with wavelengths shorter than the emission wavelength of the lamp 2, or a bandpass filter with characteristics as shown in FIG. 9C, namely a filter which peaks in transmittance at a wavelength almost equal to the emission wavelength of the lamp 2, is located at the position of the optical filter 20 or in front of the lens 10 as shown in FIG. 9A. As a result, light with wavelengths other than the required wavelength (emission wavelength of the lamp 2) is removed and the quantity of the detected rays of light from the lamp 2 is relatively large. Here, the wavelength y at which the filter begins to block light and the way the transmittance declines (FIG. 9D) as well as wavelength z at the peak transmittance, transmittance and half bandwidth of the bandpass filter should be selected according to the application purpose and the imaging device performance. FIG. 9B shows an image of raindrops taken by the imaging device combined with this type of filter.

Figure 10:
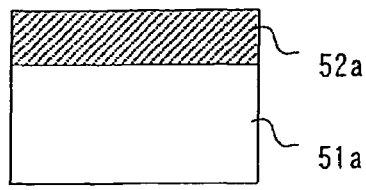
FIGS. 10A, 10B, 10C and 10D show different optical filter structures where
Figure 10:
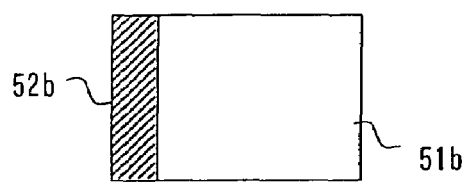
Figure 10:
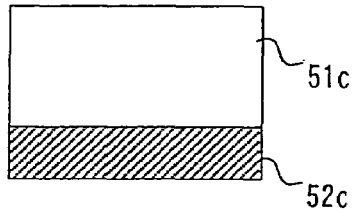
Figure 10:
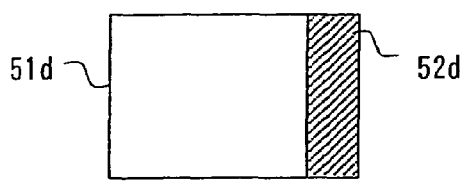

FIGS. 10A to 10D show a filter whose optical characteristics vary with filter areas. For example, the image processing area is divided so that the upper two thirds of the screen are dedicated to adaptive front lighting system and the lower one third to raindrop detection. For these two functions to be performed at the same time, one filter may consist of two areas: an area 51a with an infrared cut function (hereinafter called the "infrared cut area") and an area 52a with bandpass characteristics, or with a peak transmittance in the infrared band (hereinafter called the "infrared bandpass area"), as illustrated in FIG. 10A. When a filter of this type is employed, only one imaging device is enough (it is no longer necessary to use as many imaging devices as the number of provided functions). This contributes to substantial reduction in size and cost.

Since only one filter is used, no reflection between filters occurs and disturbing light which unfavorably affects the result of image processing is decreased. No mechanically movable part is required and the filter is fixed. Consequently, even when the speed of taking an image is high, it is possible to take plural images successively.

The filter surface can be divided in various ways as shown in FIGS. 10B to 10D. However, as suggested in FIGS. 7B and 7C, usually headlights of an oncoming vehicle or taillights of a vehicle in front appears in the upper area of the image while a traffic lane near the driver's own vehicle appears in the lower area of the image. In this sense, information in the upper area of the image is more important for adaptive front lighting system than information in the lower area. For this reason, when one filter is used for both the adaptive front lighting control function and the raindrop detection function, it is desirable that as mentioned above, the lower area of the screen functions as an infrared bandpass area for raindrop detection and the remaining area as an infrared cut area for adaptive front lighting, as shown in FIG. 10A.

Figure 11:
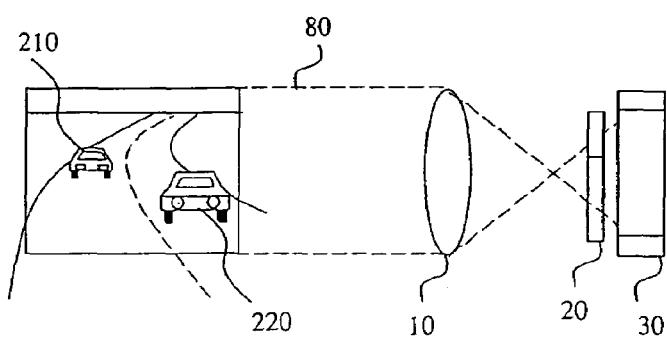
FIG. 11 shows an example of an imaging device structure.
Figure 12:
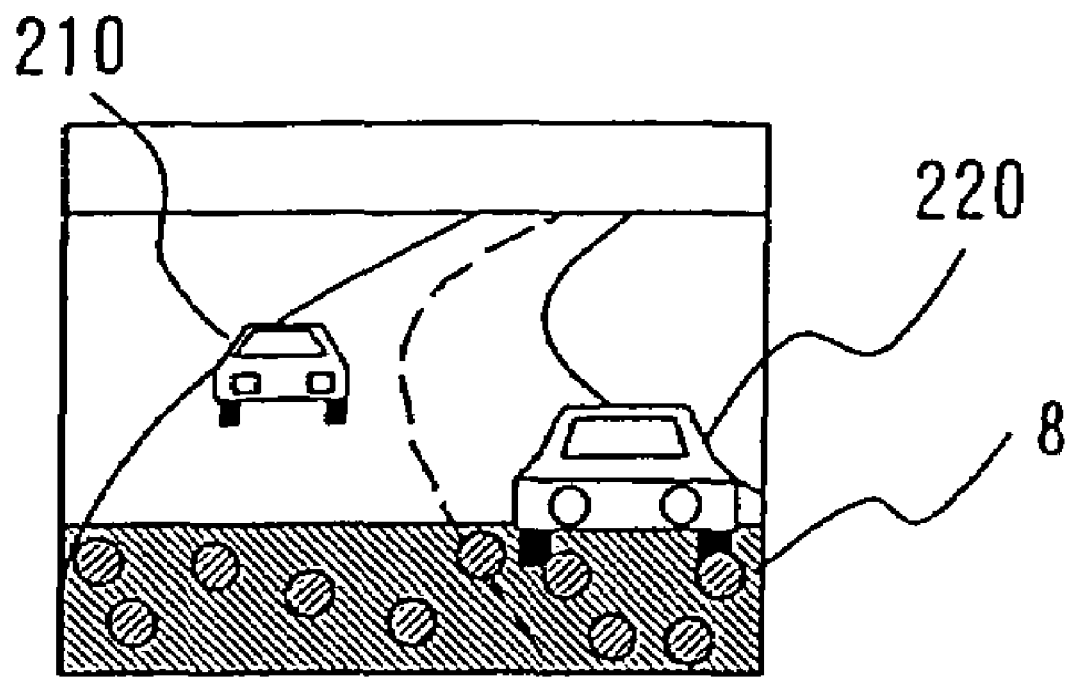
FIG. 12 is an illustration of an image captured by an imaging device.

FIG. 11 shows an imaging device with an optical filter 20 as shown in FIG. 10A. FIG. 12 shows an image captured when the optical filter 20 is attached to an imaging device as shown in FIG. 11. Here, the lens 10 produces an upside-down image of a real scene on the imaging device 30. Hence, in order to make the lower area of the screen an infrared bandpass area for raindrop detection, the optical filter 20 should be installed with its infrared bandpass area 52 up. FIG. 12 shows an image of raindrops and vehicles captured by this type of imaging device.

When the imaging device has a structure as mentioned above and the image processor uses an image formed by light passing through the infrared bandpass area (hereinafter this image area is called the "infrared bandpass area on the imaging device") for the purpose of raindrop detection and uses an image formed by light passing through the infrared cut area (hereinafter this image area is called the "infrared cut area on the imaging device") for the purpose of adaptive front lighting, a single filter can provide both the raindrop detection function and the adaptive front lighting system function without a mechanically movable part.

In this case, there may be a gap between the optical filter 20 and the imaging device 30. However, when the optical filter 20 is in contact with the imaging device 30, it is easier to align the boundaries of the optical filter 20 with those of the imaging device 30.

The infrared cut area and infrared bandpass area on the imaging device 30 can be defined by pixel numbers of the imaging device 30. Taking the case of FIG. 10A as an example, the area from the top of the imaging device 30 down to the N-th pixel is defined as an infrared bypass area and the area from the bottom of the imaging device 30 to the M-th pixel as an infrared cut area.

Figure 13:
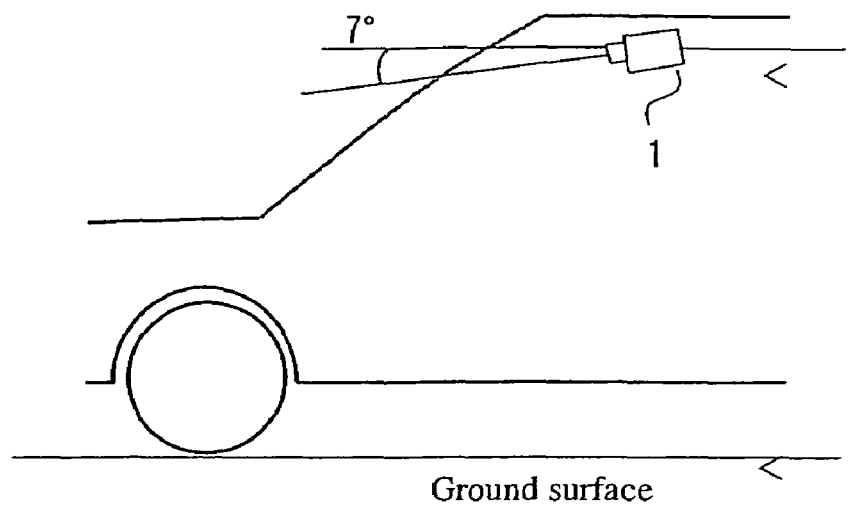
FIGS. 13A, 13B and 13C illustrate the effect of inclining an imaging element or imaging device where
Figure 13:
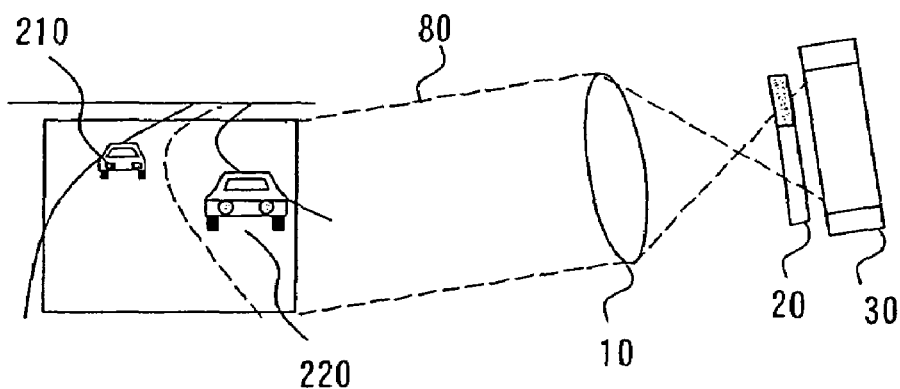
Figure 13:
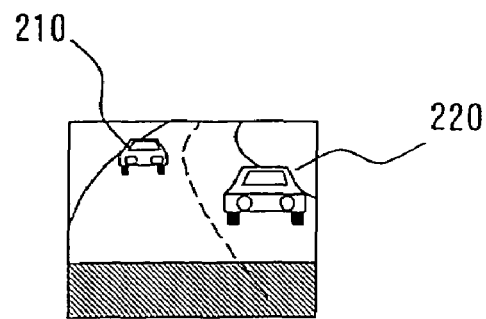

The quantity of light which goes through the infrared bandpass area into the imaging device 30 is smaller than that of light which goes through the infrared cut area into it. Hence, in some driving or light conditions, if the imaging device shutter speed is set so as not to cause saturation in the infrared cut area of the imaging device 30, the image in the infrared bandpass area may be dark due to underexposure and taillight or headlight of a nearby vehicle may be invisible. For this reason, the image processor 1, which consists of an imaging device section and an image processing section, is tilted forwards from its horizontal position as shown in FIG. 13A so that taillight or headlight of a far vehicle and that of a nearby vehicle are thrown on the infrared cut area to effectuate the adaptive front lighting function. The tilting angle depends on the height of the vehicle, the size and location of the lens 10 and the imaging device 30. Generally speaking 7 degrees or so is desirable. It is also acceptable to tilt only the imaging device section. Also, when the view angle of the lens is widened downward to broaden the imaging area, a similar effect can be achieved.

Another embodiment, which provides both a traffic lane detection function and a raindrop detection function, will be described below. The raindrop detection function is provided by making the upper part of the filter an infrared bandpass area as stated above (see FIG. 10A).

Figure 14:
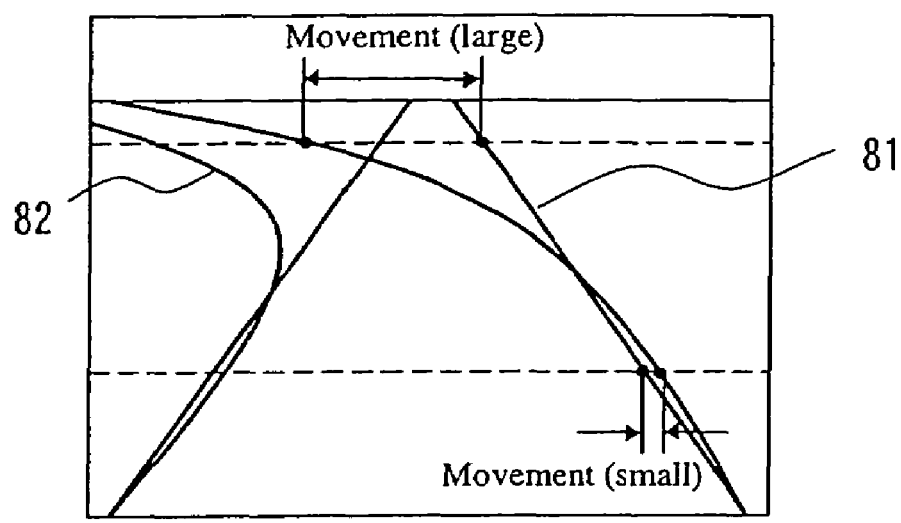
FIG. 14 illustrates an area required to detect a traffic lane.

On the other hand, detection of a nearby traffic lane is particularly important for realization of a traffic lane detection function for the following reason. As shown in FIG. 14, a traffic lane can be a straight lane 81 or a curved lane 82 and as the traffic lane is farther, the amount of on-screen movement of its image is larger. On the other hand, when a vehicle runs inside a traffic lane, the amount of on-screen movement of the image of a nearer part of the traffic lane is smaller.

Therefore, when the upper part of the filter constitutes an infrared bandpass area, an image of a nearer part of the traffic lane appears on the lower part of the screen (this image is important for the lane detection function), that is, the lane image information goes through the upper part of the filter, or the infrared bandpass area into the imaging device 30. Since the lane image information has a wavelength in the visible light range, the bandpass characteristics cause attenuation and decrease the quantity of transmitted light and it is thus difficult to detect a traffic lane at night.

Besides, when a curve in the lane is to be predicted from the lane configuration, it is necessary to detect not only a nearby lane part but also a remote lane part. In this connection, an image of a remote object is not unnecessary and the use of the lower part of the filter as the bandpass area for raindrop detection is not desirable.

If the image processor 1 is tilted, for example, 7 degrees as shown in FIG. 13A, a traffic lane image which covers both a far vehicle and a nearby vehicle appears outside the infrared bandpass area as shown in FIG. 13C so that the raindrop detection function and lane detection function are both effective. Here it is acceptable to tilt the imaging device section only. When a lens with a wider view angle is employed to broaden the imaging area, both an image which covers a far vehicle and a nearby vehicle can appear on the screen while the area required for raindrop detection is maintained.

In most cases, if the camera is tilted downward further, an image of the vehicle's hood appears on the screen and sunlight reflected by the vehicle's hood and taillight of a vehicle in front cause disturbance, which unfavorably affects the lane detection and adaptive front lighting functions. However, when the filter as shown in FIG. 10A is employed, due to the bandpass characteristics, such disturbance can be eliminated and the area concerned can be allocated to image processing for raindrop detection. When the above filter is employed, an area which was thought to be unsuitable for image processing can be used for image processing. In addition, when an infrared light source with a wavelength equivalent to the bandpass filter transmittance is used, it is possible to detect an obstacle on the road and identify the position of a vehicle in front.

The above embodiments provide a possible best configuration in which a filter is located between the lens 10 and imaging device 30. An alternative approach to attaining similar effects is that a lens or a lens cover to be attached to the front of the lens has the same optical characteristics as the above filter.

Figure 15:
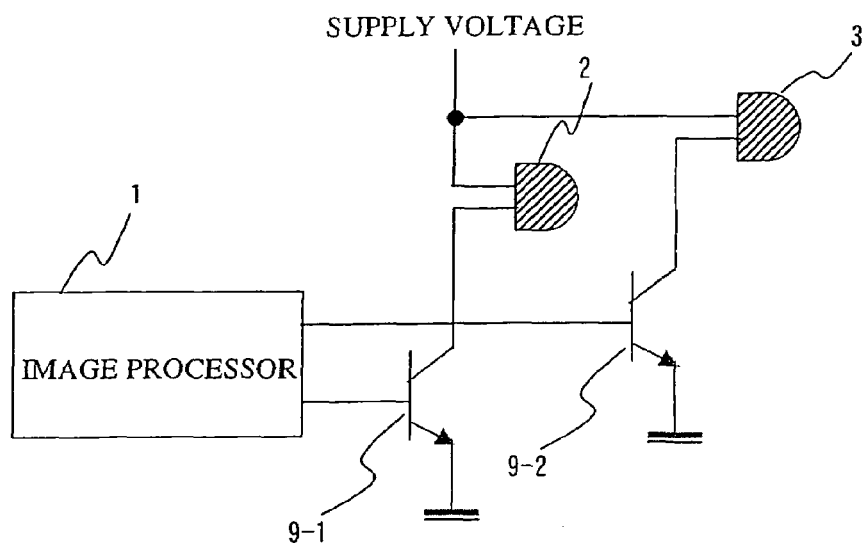
FIGS. 15A and 15B show an example of operation of a lamp drive circuit and an image processor where
Figure 15:
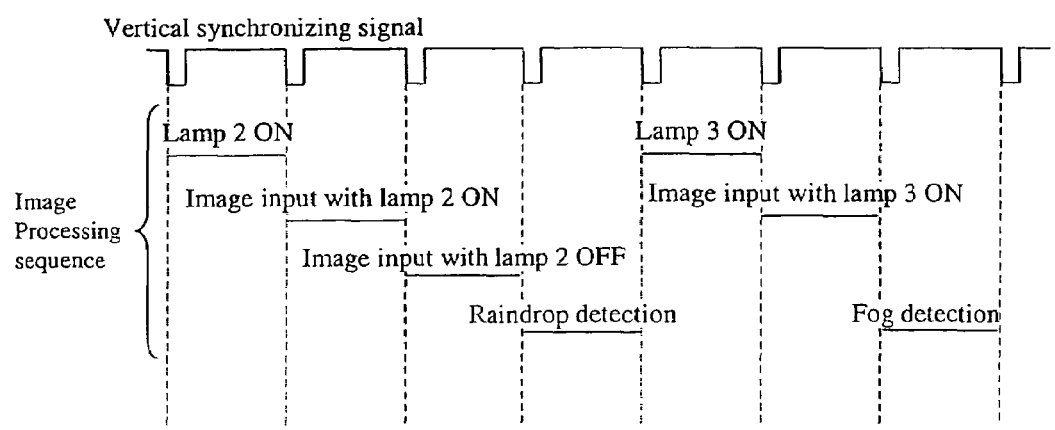

Referring to FIGS. 15A and 15B, an explanation will be given below about how raindrops on the outer surface of the windshield 4 and fog on its inner surface are detected by an image processing system according to the present invention. FIG. 15A shows an example of a lamp drive circuit for the lamps 2 and 3 and FIG. 15B is a timing diagram showing when to turn on the lamps for raindrop and fog detection synchronously with a vertical synchronizing signal. For light emission of the lamp 2, an image processor 1 controls the base voltage of a transistor 9-1 to supply a given current to the lamp 2. For light emission of the lamp 3, it controls the base voltage of a transistor 9-2 to supply a given current to the lamp 3. For detection of raindrops on the outer surface of the windshield 4, the image processor 1 turns on the first lamp 2 to illuminate the windshield 4. If there are raindrops on the outer surface of the window glass 4, the raindrops cause scattering of the light from the first lamp 2 and some reflected light rays enter the imaging device 30. The imaging device 30 generates an image signal according to the received light. The image signal is sent to an image processing section (not shown). As the image signal is processed by the image processing section, the raindrops on the outer surface of the windshield 4 are detected. Although the image processing section is located inside the image processor 1 in this case, it may be located separately from the image processor 1.

FIGS. 16A and 16B are flowcharts showing an image processing sequence according to a raindrop detection program. In the flowchart of FIG. 16A, at step 1, as the lamp 2 is turned on, the image processing section receives an image signal from the imaging device 30. At step 2, edge detection is done on the image signal, for example, using the known Laplacian filter. An image which emphasizes the boundaries between raindrop areas and non-raindrop areas is created through this edge detection process.

At step 3, the edge image created at step 2 undergoes a circle detection process. For circle detection, the known Generalized Hough Transform method may be used. After circle detection at step 3, counting of detected circles is carried out at step 4. At step 5, the number of circles is converted into an amount of rainfall. This concludes the raindrop detection process.

Here, if the outer surface of the windshield 4 is water-repellent finished, raindrops tend to become circles which are convenient for image processing. If the lens 10 is arranged to focus light not on the windshield 4 but on a remoter point, an image of a raindrop will blur and be more circular, which makes it easier to detect the raindrop. When individual raindrops are distinguished as circles, the image processor 1 can calculate the amount of rainfall in every unit time.

FIG. 16B shows another raindrop detection process. In the process of FIG. 16B, at step 21, the image processing section receives image signals from the imaging device 30 when the lamp 2 is turned on and off. At step 22, a brightness difference between image signals is calculated. At step 23, an average is calculated based on the brightness difference calculated at step 22 and compared against a predetermined threshold to see which is larger. If the brightness difference is larger than the threshold, at step 24 it is decided that raindrops/stain have been detected. At step 25, the brightness difference calculated at step 22 is converted into an amount of rainfall. This concludes the whole detection process. If the brightness difference is smaller than the threshold, the process is ended without starting the wiper. In this method, even when an image of a raindrop is not circular (for example, mist), the amount of rainfall can be estimated.

The processes of FIGS. 16A and 16B may be used independently or in combination. When they are combined, the amount of rainfall is measured with higher accuracy. It is recommended that the programs for the processes of FIGS. 16A and 16B be stored in the memory of the image processor 1.

Figure 17:
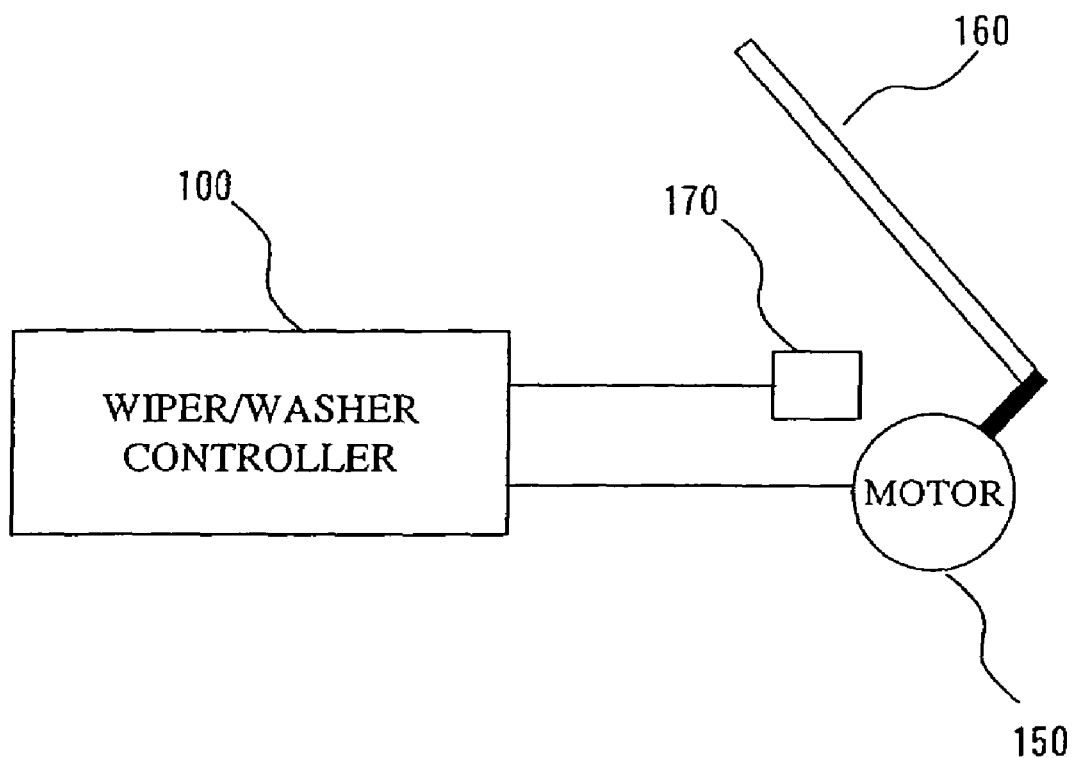
FIG. 17 illustrates how a wiper and a washer are controlled.

The image processor 1 controls the wiper or washer according to the amount of rainfall calculated through the processes of FIGS. 16A and 16B. FIG. 17 shows a wiper/washer control system. The system consists of a wiper/washer controller 100, a wiper 160, a motor for moving the wiper 160 and a washer 170.

Figure 18:
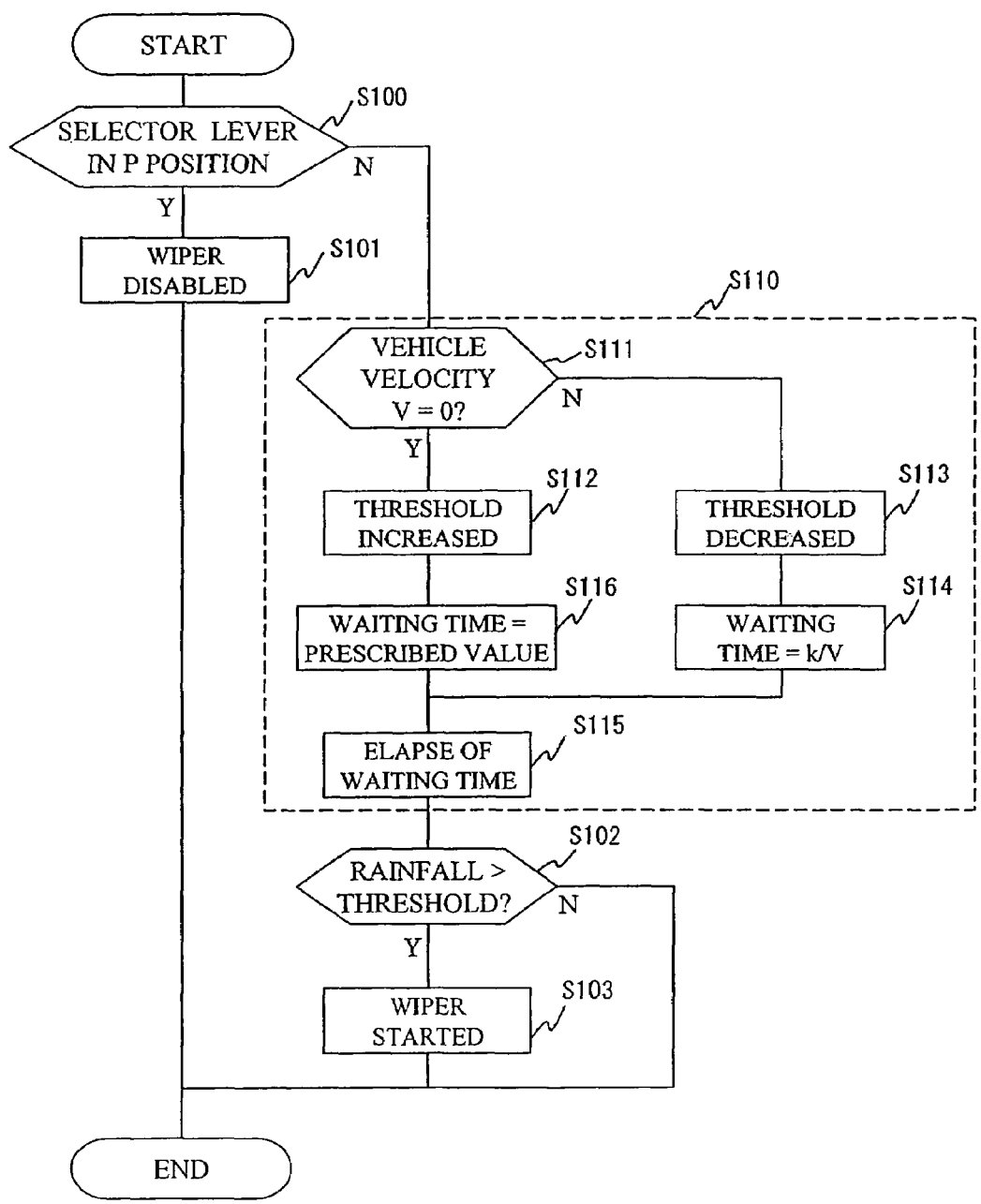
FIG. 18 is a flowchart showing a wiper control sequence.

FIG. 18 is a flowchart showing how the wiper/washer controller 100 controls the wiper 160. First, at step 100, a decision is made as to whether the selector lever is in the parking position (P position). If the selector lever is in the P position, the wiper 160 is disabled. This prevents the wiper 160 from working mistakenly while the vehicle is being washed. If the selector lever is not in the P position, the wiper is started at step 110.

Figure 19:
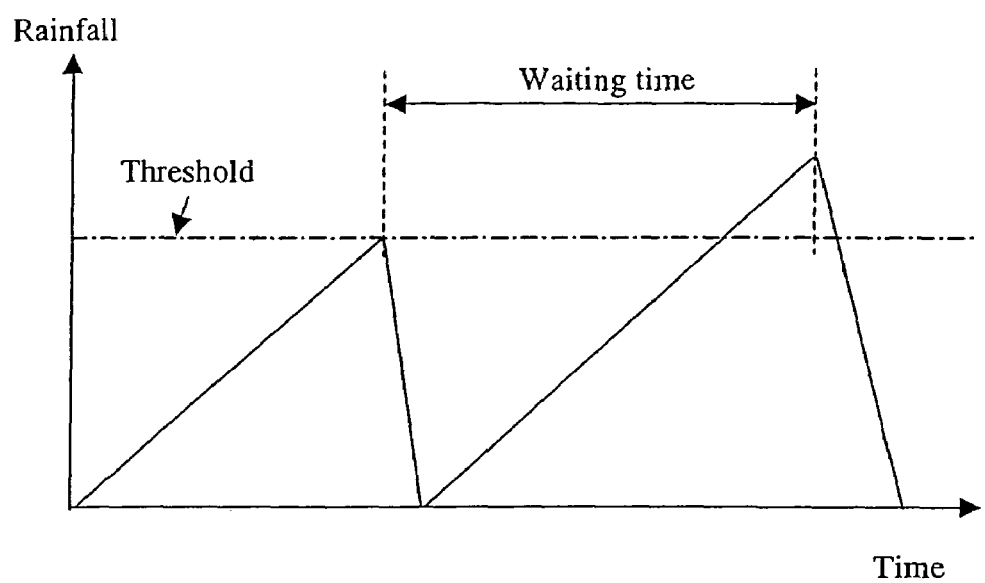
FIG. 19 shows how wiper movement begins.

FIG. 19 is a graph showing a process of starting the wiper 160 at step 110. In the graph, the horizontal axis represents time and the vertical axis represents the amount of rainfall. If the amount of rainfall exceeds the threshold, the wiper 160 begins moving. At step 111, a decision is made as to whether the vehicle velocity V is 0 or not. If the velocity is 0, the rainfall threshold which is used to decide whether to start the wiper 160 is increased. At step 116, the waiting time is set to a prescribed value. If it is decided at step 111 that the vehicle velocity is not 0, the rainfall threshold should be a prescribed value or a value which depends on the vehicle velocity. At step 113, the rainfall threshold is changed depending on the vehicle velocity. After the wiper 160 is started, a waiting time for the wiper 160 to begin moving next should be calculated. At step 114, a value which is in inverse proportion to the vehicle velocity V is calculated as the waiting time (k represents a coefficient). The waiting time may be determined depending not only on the vehicle velocity but also on the raindrop particle diameter using a formula given below. In the formula, k1, k2 and k3 represent coefficients.

$$\text{Waiting Time} = k1 / (\text{Rainfall}) + k2 * (\text{Particle Diameter}) + k3 / (\text{Vehicle Velocity})$$

This waiting time is intended to prevent the wiper 160 from beginning moving instantly upon detection of a water film or water streaks as a result of wiping with a wiper blade. Next, the waiting time elapses at step 115. At step 102, the amount of rainfall is compared with the rainfall threshold for start of the wiper 160. If the amount of rainfall is larger than the threshold, the wiper 160 is started at step 103 and the whole process is concluded. If the amount of rainfall is smaller than the threshold, the process is ended without starting the wiper 160.

Figure 20:
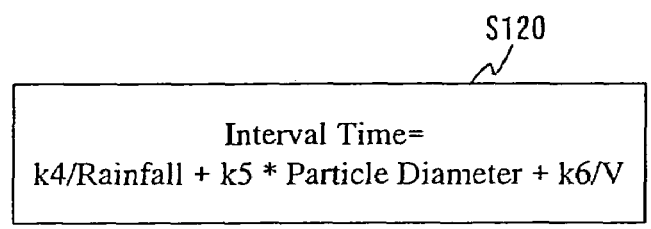
FIG. 20 shows a formula for time interval in wiper intermittent movement.

Another formula for start of the wiper is indicated in FIG. 20. Step 120 of FIG. 20 may be used instead of step 110 of FIG. 18. This formula is used to calculate the time interval in wiper intermittent movement. In the formula, k4, k5 and k6 represent coefficients. The interval is determined according to the measured amount of rainfall or the measured raindrop particle diameter. When the amount of rainfall is large or the particle diameter is small, the interval is shortened. On the other hand, when the amount of rainfall is small or the particle diameter is large, the interval is lengthened. The interval may also be varied depending on the vehicle velocity V. For example, if the vehicle is running at a high velocity, an air stream may cause raindrops to drip down on the outer surface of the windshield 4, so it may be desirable to make the interval longer.

The diameter of each raindrop (particle) is measured as mentioned above. When the windshield is more water-repellent, raindrops are closer to circle and their diameter is easier to measure. The water repellency can be evaluated using the shape and reflection brightness of raindrops which are obtained from the input image (FIG. 16). Also, when an image of the windshield 4 is taken after movement of the wiper 160 and the quantity of raindrops left not wiped off and their shape (raindrop streaks) are detected, the damage of the blade of the wiper 160 can be evaluated. The water repellency and the damage of the blade are evaluated by another method as follows. The electric current flowing through the motor 150 (FIG. 17) is detected to estimate the torque of the motor 150. If the torque is larger than before, it may be considered that the water repellency worsens or the blade is damaged. The driver is warned of the degree of water repellency or blade damage so that a good visibility is always assured.

It is desirable to make arrangements as follows. After raindrops or stain is detected at step 24 (FIG. 16B) and the wiper 160 is started, if raindrops or stain is detected again at the same position, it is decided that stain is fixed on the windshield 4 and the washer 170 is activated to wash the windshield 4 with water.

Since the image processor 1 controls the wiper 160's wiping cycle (waiting time or interval time), the cycle in which the image processor 1 receives an image from the imaging device 30 can be changed according to the wiping cycle of the wiper 160. When the amount of rainfall is small, the raindrop detection cycle should be longer. When the amount of rainfall is large, it should be shorter. This improves the efficiency of image processing.

Furthermore, the wiping cycle of the wiper 160 may be changed according to the brightness of the surrounding environment, including street light and light from other vehicles, which is calculated from the input image (FIG. 16B). For example, if the brightness is high, the wiping cycle is sped up; if the brightness is low, the cycle is sped down. In a misty condition, this prevents scattering of street light or vehicle light due to raindrops which might lower visibility.

Figures 21, 22:
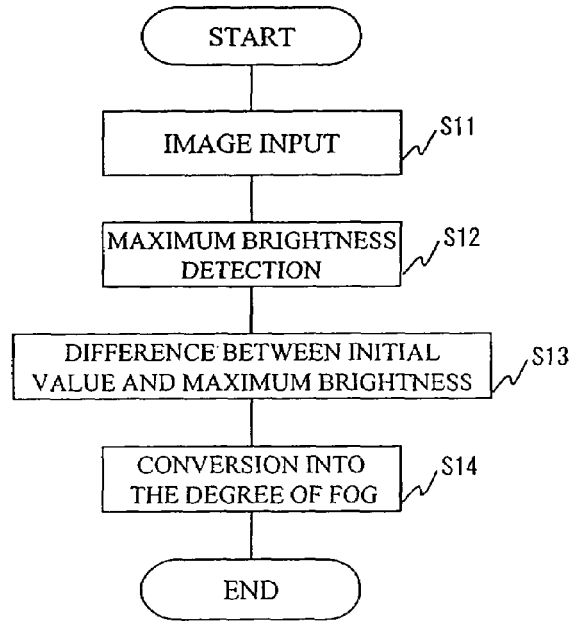
FIG. 21 is a table illustrating how fog lamps and high beam light are controlled.
FIG. 22 is a flowchart showing a fog detection sequence.

It is also possible that the fog lamp is turned on and off or the high beam light is disabled or enabled according to the calculated amount of rainfall. For example, when the amount of rainfall is large, the fog lamp should automatically turn on and the high beam light should be disabled, as shown in the table of FIG. 21. FIG. 21 suggests that when the amount of rainfall is large, the fog lamp automatically turns on (if it is off), or a warning is given to the driver to urge him/her to turn on the fog lamp (if the fog lamp is on, no warning is given). In this case, if the high beam light is off, it is disabled; if it is on, it automatically turns off or a warning is given to the driver to urge him/her to turn off the light. On the other hand, when the amount of rainfall is small, control of the fog lamp is not done and the high beam light is controlled so that it automatically turns on or off depending on the position (distance, direction) of a vehicle in front or an oncoming vehicle. This prevents scattering of headlight due to rainfall and assures a good visibility.

Next, a fog detection method will be described. In order to detect fog on the inner surface of the windshield 4 which may be caused by the difference between the room temperature and the outside air temperature, the image processor 1 turns on the second lamp 3 to illuminate the windshield 4. If there is no fog on the inner surface of the windshield 4, the inner surface of the windshield 4 totally reflects light from the second lamp 3 and the reflected light reaches the imaging device 30. If there is fog on the inner surface of the windshield 4, light from the second lamp 3 scatters due to the fog and some reflected light rays reach the imaging device 30. The memory inside the image processor 1 previously stores, as an initial value, the maximum brightness of reflected light under the condition that there is no fog on the inner surface of the windshield 4. The image processing section receives an image signal from the imaging device 30 and determines the maximum brightness of the image and calculates the difference from the stored initial value. If the difference calculated by the image processing section is large, it is decided that there is fog on the inner surface of the windshield 4.

FIG. 22 is a flowchart showing a fog detection process. At step 11, the image processing section turns on the second lamp 3 to illuminate the windshield 4 and receives an image signal from the imaging device 30. At step 12, the maximum brightness of light reflected by the inner surface of the windshield 4 is detected. At step 13, the difference between the detected brightness and the initial value stored in the memory is calculated. At step 14, the difference is converted into the degree of fog: fog is thus measured and the fog detection process (FIG. 22) is concluded. As the image processor 1 detects fog on the inner surface of the windshield 4, the image processor 1 activates an air conditioner and controls the ventilation, temperature and air flow inside the vehicle in order to defog the windshield 4.

Next, another embodiment of the present invention will be described. It is possible that the image processor 1 controls the first and second lamps 2 and 3 according to the measurement of external light based on an image which it obtains and processes. For example, it decides whether it is daytime or nighttime and accordingly changes where to focus the first and second lamps 2 and 3.

Figure 23:
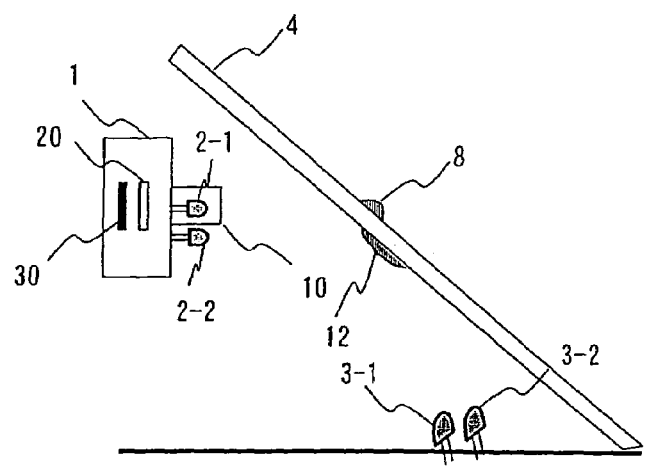
FIG. 23 is a schematic diagram showing an image processing system according to another embodiment of the present invention.
Figure 24:
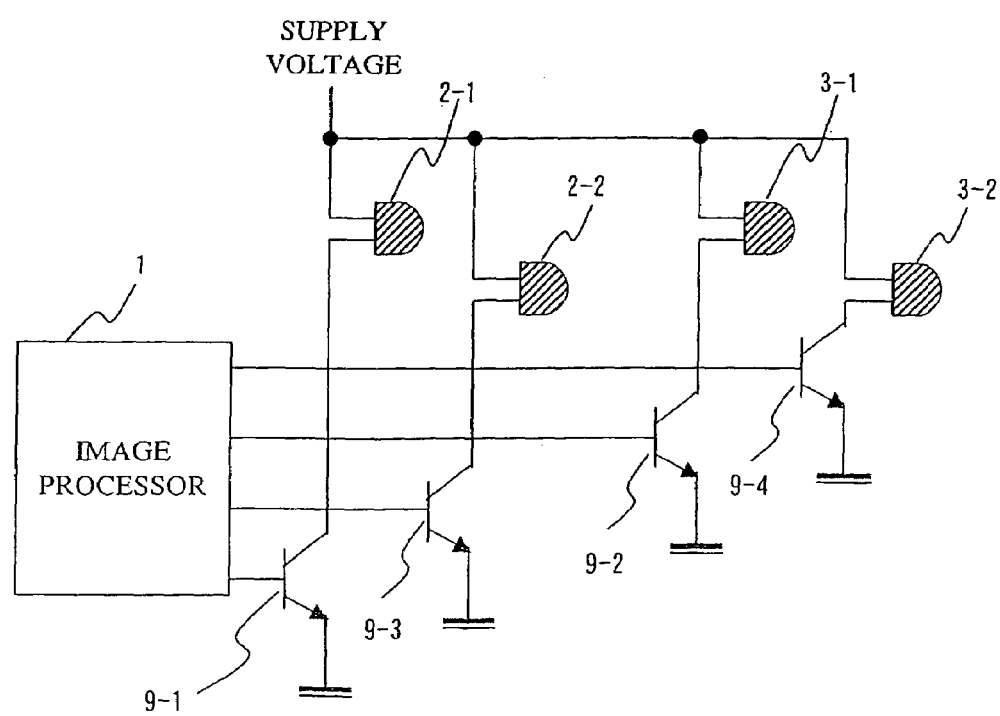
FIG. 24 shows a light intensity control circuit for lamps.

How it works concretely is explained with reference to FIGS. 23 and 24. In this embodiment, a plurality of light emitting elements (lamps) are used in place of the first lamp 2 and the second lamp 3 in the above embodiment. In the example shown in FIGS. 23 and 24, two first lamps 2-1 and 2-2 and two second lamps 3-1 and 3-2 are used.

During daytime, ambient light including sunlight gets into the imaging device 30. If an image is taken during daytime while the first and second lamps are off, the image is bright. Therefore, whether it is daytime or nighttime can be known by analyzing the brightness of the image taken by the imaging device 30 through the image processing section. Since the imaging device 30 faces forward, the image includes the road on which the vehicle is running. During daytime, the road surface area in the image is dark. It may be thus desirable to arrange that if the image taken by the imaging device 30 includes a dark area, the lamp to be used is selected so as to focus light on the dark area. Here, the lamp 2-2 is located slightly below the lamp 2-1 (which is almost in alignment with the center of the imaging device 30) so as to emit light to the part of the windshield 4 which almost corresponds to the road surface. The lamp 3-2 is nearer to the windshield 4 than the lamp 3-1 so as to emit light to the part of the windshield 4 which almost corresponds to the road surface. During daytime, a drive circuit (FIG. 24) controls the base voltage of a transistor 9-3 or 9-4 so as to supply a given current to the lamp 2-2 or 3-2 to turn it on. When it is not daytime, the base voltage of the transistor 9-1 or 9-2 is controlled so as to supply a given current to the lamp 2-1 or 3-1 to turn it on. As a consequence, the influence of bright ambient light including sunlight is reduced in detection of raindrops or fog.

It is also possible that the image processor 1 controls the light intensities of the first and second lamps 2 and 3 according to the measurement of external light based on an image which it obtains and processes. The intensity of ambient or external light in the vicinity of the vehicle can be determined in the same manner as when a decision is made as to whether it is daytime or nighttime. Here, if external light is bright, the lamp light intensity is increased; and if external light is dark, the lamp light intensity is decreased. For this control system, the drive circuit shown in FIG. 24 is used again. For example, the image processing section controls the base voltages of the transistors 9-1, 9-2, 9-3, and 9-4 to control current to the lamps 2-1, 2-2, 3-1, and 3-2 to adjust the light intensities of the lamps. In an image processing system which adopts this control system, raindrops and fog are detected with no influence of external light even during daytime. If the lamps 2-1, 2-2, 3-1, and 3-2 emit infrared light, raindrops and fog are detected during nighttime without dazzling other vehicles and pedestrians.

Figure 25:
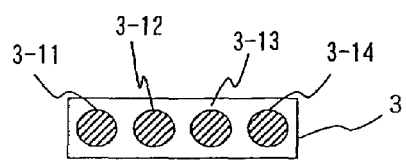
FIGS. 25A, 25B, 25C and 25D are schematic diagrams showing a second light source composed of a plurality of light emitters and examples of their applications where
Figure 25:
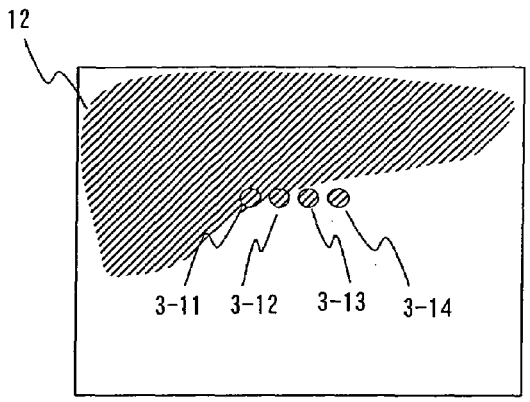
Figure 25:
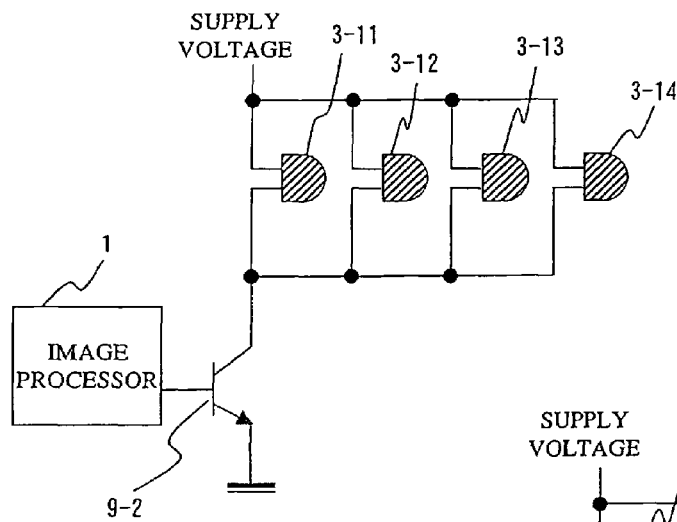
Figure 25:
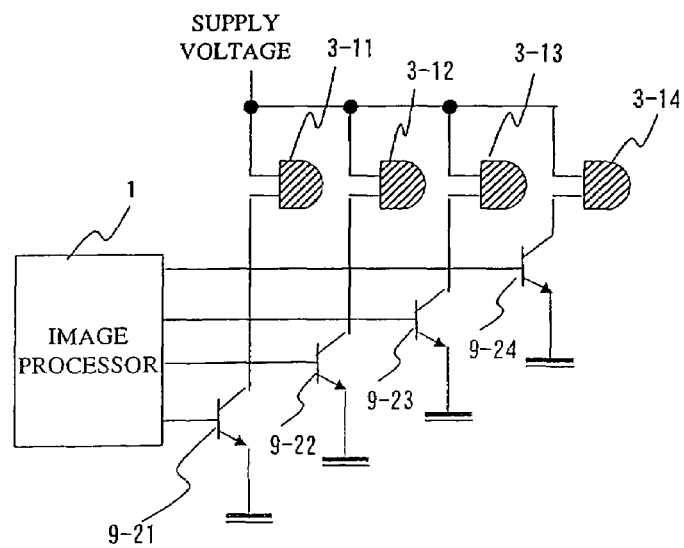

In a further embodiment of the present invention, as shown in FIG. 25A, an array of second lamps is used. In the example of FIG. 25A, four lamps 3-11, 3-12, 3-13, and 3-14 constitute a second light source. FIG. 25C shows a drive circuit for the array of lamps. In this circuit, the four lamps 3-11, 3-12, 3-13, and 3-14 are controlled so as to turn on simultaneously. An alternative drive circuit is shown in FIG. 25D where transistors 9-21 to 9-24 are used to turn on the lamps. In the drive circuit as shown in FIG. 25D, the four lamps 3-11, 3-12, 3-13, and 3-14 are controlled so as to turn on one by one sequentially. According to this embodiment, which uses either of the above lamp control systems, not only the fogginess of the windshield 4 but also the direction and speed of fog spread can be measured through the image processing section or other means.

For example, if fog appears on the upper part of the inner surface of the windshield 4 and light from the lamp 3-11 as reflected by the windshield 4 first becomes darker and then reflected light which originates in the lamp 3-12, the lamp 3-13 and the lamp 3-14 becomes darker in the order of mention, this implies that the fog on the inner surface of the windshield 4 spreads in the direction from the lamp 3-11 toward the lamp 3-14. Conversely, if light reflected by the windshield 4 becomes darker in the order from the lamp 3-14 to the lamp 3-11, the direction of fog spread on the inner surface of the windshield 4 is opposite to the above.

In addition, the speed of fog spread on the inner surface of the windshield 4 can be calculated by finding the time interval from when reflected light originating in the lamp 3-11 darkens until reflected light originating in the lamp 3-12 darkens and the time interval from when reflected light originating in the lamp 32 darkens until reflected light originating in the lamp 3-13 darkens. In this case, the distance among the lamps 3-11 to 3-14 should be stored in the memory for the purpose of such calculation. In this embodiment, because it is possible to know whether the fog area is expanding or shrinking from the peripheral area of the windshield, and also its expansion or shrinkage speed, the air flow rate of the defroster can be controlled adequately to defog the windshield 4 efficiently.

When fog on the inner surface of the windshield 4 is detected, the air conditioning may be activated to defog it before the wiper is activated according to the amount of rainfall detected through the rainfall detection process. This minimizes the possibility that fog on the windshield 4 makes it harder to detect raindrops. Furthermore, this improves the accuracy of image processing results in the raindrop detection processes shown in FIGS. 16A and 16B.

In the image processing system according to this embodiment, raindrops and fog on the windshield are detected accurately and the wiper and defroster are controlled adequately so that the driver can see ahead clearly and recognize the traffic lane and a vehicle in front easily. Consequently, the driver can control the vehicle according to the obtained information on the lane or vehicle in front.

In the image processing system according to this embodiment, the focal length of the lens 10 is fixed. However, instead a zoom lens may be used to vary the focal length so that it can be focused on a point beyond the windshield 4 or the vehicle to capture an image of a remote object. In such an image processing system, clear images of both a nearby object and a remote object can be obtained, namely it is possible for one image processing system to detect taillight of a remote vehicle running ahead and headlight of an oncoming vehicle in concurrence with detection of raindrops or fog.

A zoom lens requires time to change its focal length. In order to shorten the time to change the focal length, the lens 10 in the image processor 1 may have a focal ratio which is above a prescribed value (for example, F2.5 or more). In such an image processing system, even when the lens is focused on a far point, it is less likely that an image of a nearby object is out of focus and taillight of a remote vehicle running ahead and headlight of an oncoming vehicle as well as raindrops or fog on the windshield 4 can be detected easily.

It is also acceptable that when the image processor 1 processes an image and detects raindrops or fog, the threshold for raindrop/fog detection is varied depending on the area for image processing, namely the area being illuminated by the first and second lamps 2 and 3. When the windshield 4 is inclined as shown in FIG. 1A or FIG. 23, the raindrop diameter or the intensity of reflected light in an image captured by the imaging device 30 may be different. Thus, it is reasonable to vary the threshold to ensure that raindrops and fog are detected properly.

Furthermore, in a vehicle with an image processing system according to the present invention, it is possible to control the wiper and/or defroster automatically according to the result of detection of foreign matter on the windshield. Also, in such a vehicle, since foreign matter is removed from the windshield, good forward visibility is assured. As a consequence, the driver can more easily recognize a traffic lane or a vehicle in front and control headlight and the distance from a vehicle in front and receive a warning if drifting from the lane occurs. In short, the controllability of the vehicle is improved.

Figure 26:
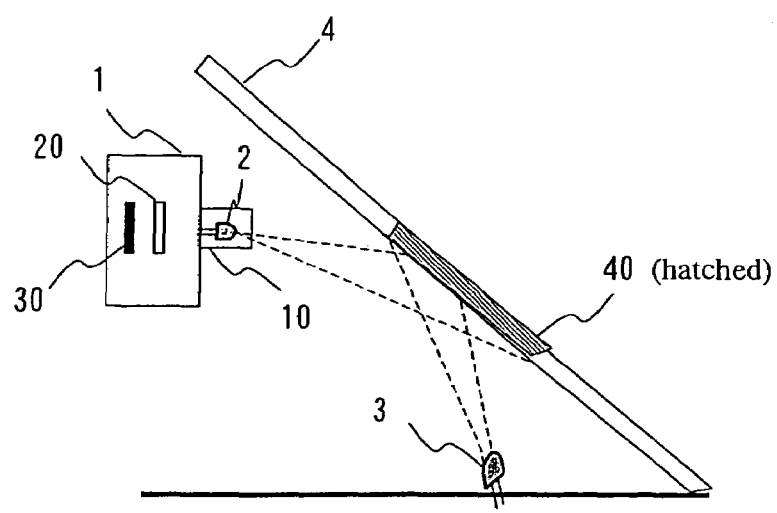
FIG. 26 is a schematic diagram showing an image processing system according to another embodiment of the present invention.

The windshield 4 may have an area which transmits infrared light (which comes from the first lamp 2 and/or second lamp 3) to be reflected and sent to the imaging device 30. Many recent vehicles use windshield with an infrared cut coating in order to reduce uncomfortable sunlight glare for drivers. In these vehicles, infrared rays from the first lamp 2 and/or second lamp 3 are absorbed by the windshield and the raindrop detection performance deteriorates because of insufficiency of reflected light. Hence, as shown in FIG. 26, a windshield area 40 (hatched) in which light from the first lamp 2 and/or second lamp 3 is reflected and sent to the imaging device 30 may remain uncoated with an infrared absorbing agent or such coating may be peeled off in that area so that reflected light is obtained efficiently and the raindrop detection performance is improved.

Figure 27:
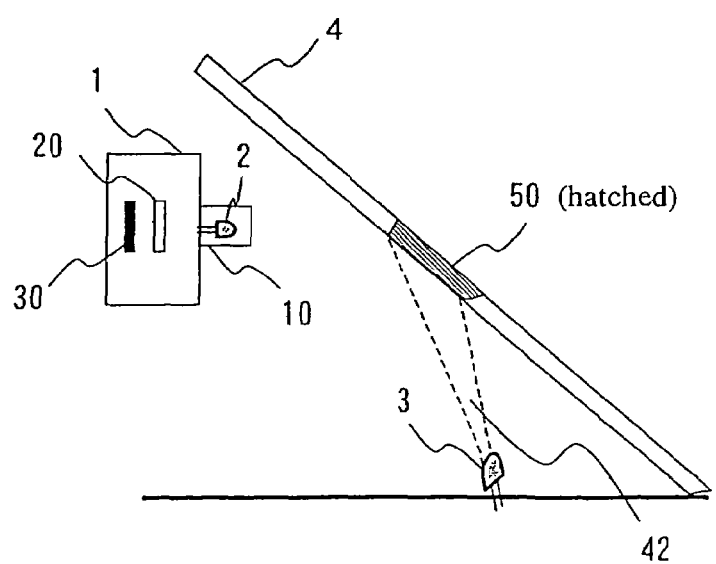
FIG. 27 is a schematic diagram showing an image processing system according to another embodiment of the present invention.

As shown in FIG. 27, an area 50 (hatched) of the window glass 4 in which light from the first lamp and/or second lamp 3 is reflected and sent to the imaging device 30 is so finished as to become foggy easily. For example, the area 50 may be frosted glass or have a water-repellent coating. When the area 50 is frosted glass or has a water-repellent coating, fog on the area as a precursor of fog on the whole windshield surface is quickly detected and the defroster is activated to prevent fog from blocking the driver's view.

The focal length of the lens 10 used in the image processor 1 may be from the windshield 4 to infinity. As stated above, the raindrop detection performance is better when the lens 10 is somewhat defocused on raindrops 8 on the windshield 4 rather than when it is exactly focused on them because each raindrop is better recognized as a circle in an image which is slightly out of focus. If the focus of the lens 10 is adjusted to infinity and the imaging device 30 uses a complementary color filter with few pixels and expresses taillight by one to four pixels, in the process of detection of taillight of a remote vehicle in front, it might be unable to reproduce color and recognize the color of the taillight as red, resulting in a taillight detection failure. To avoid this, the lens 10 should be focused to somewhere before infinity so that, due to blurring, the taillight of the vehicle in front is expressed by four or more pixels and the imaging device 30 reproduces color correctly. As a result, the focus of the lens 10 can be fixed so as to satisfy the conditions necessary for detection of raindrops and taillight of a vehicle in front.

According to the present invention, it is possible to detect foreign matter such as raindrops and fog on the windshield and taillight of a vehicle in front at the same time.

The present invention can be applied to detect raindrops, fog and dust on surfaces of many types of window glass as used not only in vehicles as suggested in the above embodiments but also in railway cars, ships, airplanes and ordinary buildings.

The present invention provides a simple structure which easily distinguishes and detects raindrops on a window outer surface and fog on a window inner surface night and day without an influence of sunlight or ambient light. According to the invention, since a single imaging device can take images under a plurality of conditions without the need for any movable part, more than one function can be offered based on information from the imaging device and the imaging device can be compact.

What is claimed is:

1. An image processing system comprising:
an imaging device which captures light
a lamp located at a place where the imaging device can directly capture light reflected by a glass;
an optical filter, located in front of the imaging device, which transmits rays with a specific wavelength of the reflected light;
a lens provided in front of the imaging device, a focus of the lens being adjusted to a point beyond the glass; and
an image processor which processes an image captured by the imaging device and detects moisture on an inner surface of the glass based on a decrease of an amount of the reflected light captured by the imaging device.

2. The image processing system as claimed in claim 1, wherein the lamp is located on a dashboard near a driver's seat in a vehicle.

3. The image processing system as claimed in claim 1, wherein the glass is a windshield of a vehicle, and foreign matter on the glass and a taillight of a vehicle in front are detected.

4. The image processing system as claimed in claim 1, wherein the optical filter has areas with different optical characteristics.

5. The image processing system as claimed in claim 4, wherein in the optical filter, one area is used as an infrared cut area, and at least one of areas other than the infrared cut area is used as an infrared bandpass area with a peak transmittance in the infrared band.

6. The image processing system as claimed in claim 5, wherein an upper area of the optical filter constitutes the infrared bandpass area when the optical filter is located between the glass and the imaging device.

7. The image processing system as claimed in claim 5, wherein an upper area of the optical filter constitutes the infrared bandpass area, and a lower area constitutes the infrared cut area when the optical filter is located between the glass and the imaging device.

8. The image processing system as claimed in claim 5, wherein the lens has a coating with optical characteristics which are the same as optical characteristics of the optical filter.

9. The image processing system as claimed in claim 5, wherein a cover is provided in front of the imaging device, and the cover has a coating the optical characteristics which are the same as optical characteristics of the optical filter.

10. The image processing system as claimed in claim 5, wherein the image processor processes an image captured in the infrared bandpass area to detect raindrops.

11. The image processing system as claimed in claim 5, wherein the image processor processes an image captured in the infrared cut area to detect a vehicle in front.

12. The image processing system as claimed in claim 5, wherein the image processor processes an image captured in the infrared cut area to detect a traffic lane.

13. The image processing system as claimed in claim 1, wherein a field of view of the image device is oriented downward from a horizontal direction.

14. The image processing system as claimed in claim 1, wherein a mirror is provided, and after light emitted from another lamp is reflected by the glass, the reflected light is reflected by the mirror and again reflected by the glass before reaching the imaging device.

15. The image processing system as claimed in claim 1, wherein the lens has one of a single fixed focus adjusted to the point beyond the glass and multiple focuses, all of the multiple focuses being adjusted to at least one point beyond the glass.

16. An image processing system comprising:
an imaging device which captures light;
a light source in the form of an array of plural light emitters, the light source being located at a place where the imaging device can directly capture light reflected by fog on a glass;
a light source controller which turns on the plural light emitters;
a lens which is provided in front of the imaging device, a focus of the lens being adjusted to a point beyond the glass; and
an image processor which processes an image captured by the imaging device;
wherein the image processor processes the image and measures at least one of an extent of fog on an inner surface of the glass, a direction of fog spread, and speed of fog spread on the inner surface of the glass based on a decrease of an amount of the reflected light captured by the imaging device.

17. The image processing system as claimed in claim 16, wherein the lens has one of a single fixed focus adjusted to the point beyond the glass and multiple focuses, all of the multiple focuses being adjusted to at least one point beyond the glass.

* * * * *